Figure 1:
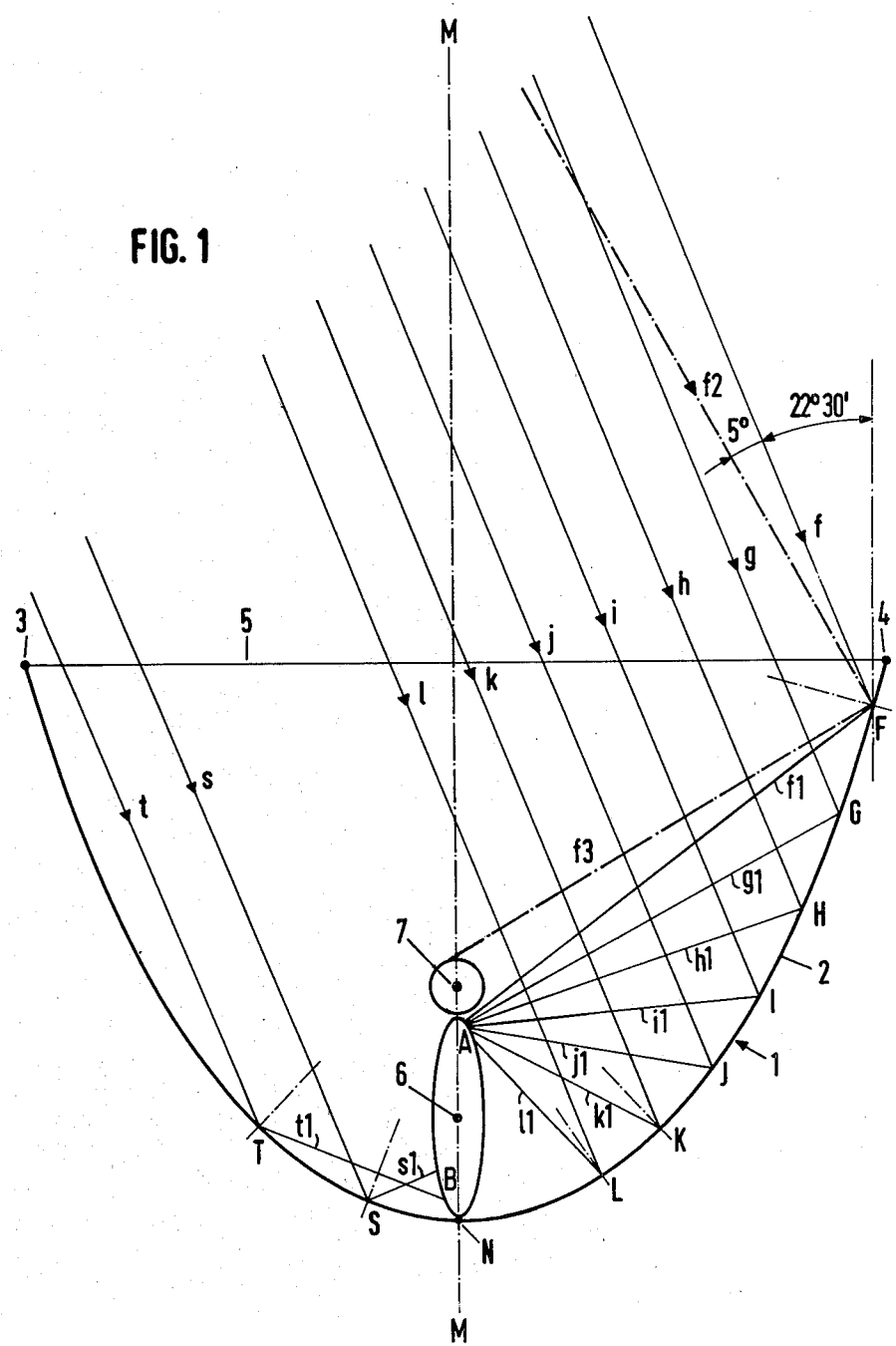

United States Patent [19]
van Kuijk

[11] 4,396,008
[45] Aug. 2, 1983

[54] SOLAR HEAT COLLECTING DEVICE COMPRISING A PLURALITY OF FIXED SOLAR HEAT COLLECTORS

[75] Inventor: Josephus P. M. van Kuijk, Blonay, Switzerland

[73] Assignee: Patlico Rights N.V., Willemstad, Netherlands Antilles

[21] Appl. No.: 221,784

[22] Filed: Dec. 31, 1980

[30] Foreign Application Priority Data

Jan. 8, 1980 [NL] Netherlands ......................... 8000113

[51] Int. Cl.³ ................................................ F24J 3/02
[52] U.S. Cl. ..................................... 126/438; 126/448
[58] Field of Search ............... 126/438, 439, 440, 450, 126/442, 449, 451, 419, 448; 165/172, 177

[56] References Cited

U.S. PATENT DOCUMENTS

| | | | |
|---|---|---|---|
| 4,121,566 | 10/1978 | Radenkovic | 126/438 |
| 4,138,994 | 2/1979 | Shipley, Jr. | 126/438 |
| 4,220,136 | 9/1980 | Penny | 126/438 |
| 4,311,132 | 1/1982 | van Kuijk | 126/438 |
| 4,327,705 | 5/1982 | Steutermann | 126/422 |

*Primary Examiner*—James C. Yeung
*Attorney, Agent, or Firm*—Anthony A. O'Brien

[57] ABSTRACT

A solar heat collection device comprising collectors arranged to be fixedly disposed as sub-collectors each of a set of at least two of such collectors, with one longitudinal edge of their screen adjoining one another. The sub-collectors are of identical construction and each designed to collect solar heat during an associated sub-period of at least two consecutive sub-periods of the solar day. Each sub-collector contains a primary liquid heating tube and a separate, secondary liquid heating tube parallel to said primary liquid heating tube and connected in series with said primary liquid heating tube in the bottom part of the sub-collector. In cross-section, the two tubes adjoin one another in the direction of depth of the sub-collector and extend, in that direction, from the deepest part of said trough for a joint height which is no greater than approximately one-fourth of the aperture width of the sub-collector, measured between the longitudinal edges thereof. Each sub-collector has a reflection screen which, in cross-section, has such a curved form that said screen, disposed in a position in which its longitudinal median plane is directed to the sun halfway the sub-period concerned, during a central period falling within said sub-period and corresponding with an angular range of the position of the sun from $-X°$ to $+X°$ relative to said longitudinal median plane, reflects the sun rays incident upon said screen substantially on to said primary tube, and during shorter time intervals immediately before and immediately after said central period, reflects the sun rays incident upon the screen mainly to the anterior secondary tube, the longitudinal median planes of the two sub-collectors forming the set being angularly offset relatively to each other through an angle of at least approximately $2X°$.

6 Claims, 2 Drawing Figures

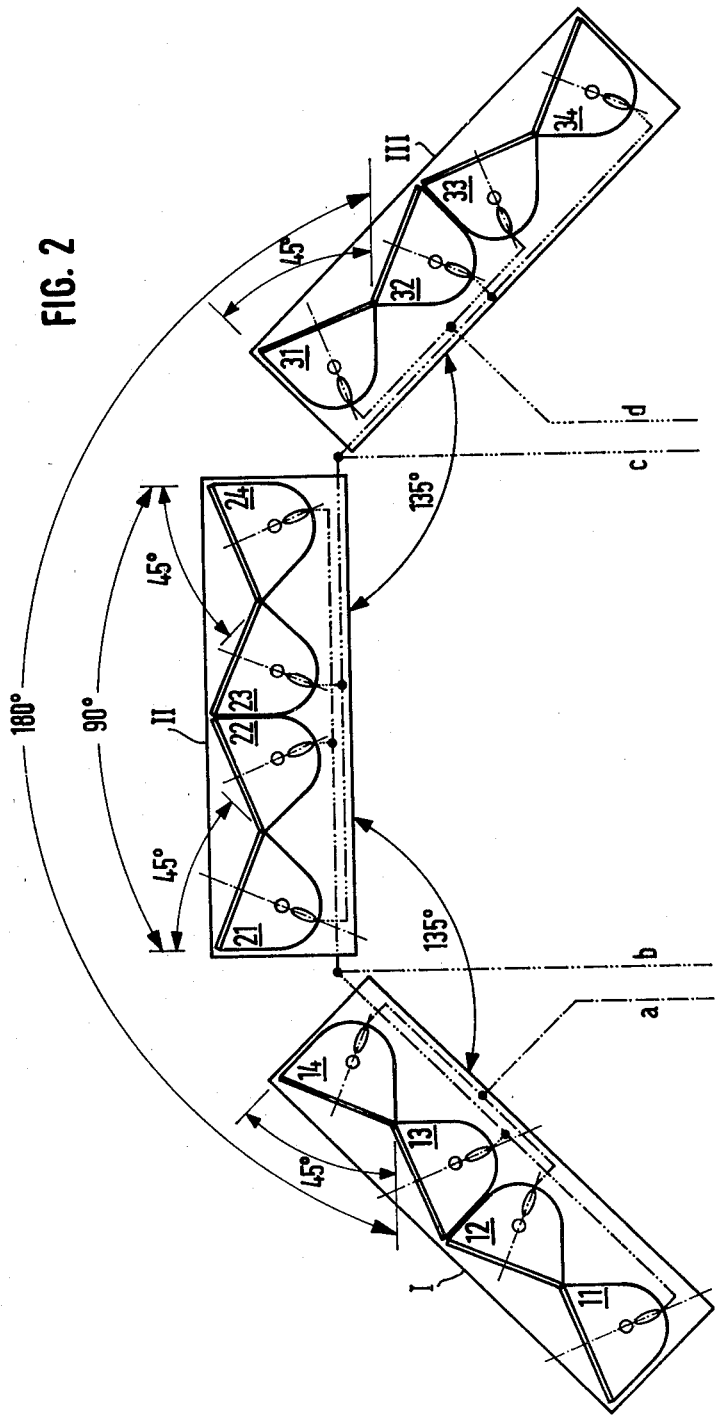

SOLAR HEAT COLLECTING DEVICE COMPRISING A PLURALITY OF FIXED SOLAR HEAT COLLECTORS

This invention relates to a solar heat collecting device comprising collectors each having a reflection screen in the form of an elongated trough of curved cross-sectional configuration and at least one liquid-heating tube to be connected to a liquid circulation system, which tube extends with its tube axis in the longitudinal median plane of the screen, which median plane is located centrally between the parallel longitudinal edges of the screen, which define the collector aperture between them, said tube extending behind, and parallel to, said aperture, said collectors being adapted to be arranged with the tube axis located in vertical planes extending in the North-South direction.

Collecting devices comprising solar heat collectors of this kind are known, in which these collectors are arranged for pivoting movement, the object being for the longitudinal median plane to be maintained as much as possible in the direction of the sun in the course of the solar day, that is to say, between sunrise and sunset. Furthermore, according to the season, one will preferably keep the inclination of the axis of such collectors adjusted to an optimum position relative to the horizontal plane.

On account of the requisite pivoting mechanisms with appurtenant drives, the movable arrangement makes the use of such collectors relatively expensive and requires a great deal of maintenance. Moreover, the drive requires energy.

Conversely, it is an object of the present invention to provide a fixed arrangement of such solar heat collectors and nevertheless provide a high heat efficiency, a particular object being to achieve as high temperatures as possible for the liquid to be heated in the liquid heating tube or tubes.

It is accordingly an object of the invention to provide a collector arrangement and construction in which each collector forms part as a sub-collector of a set of at least two of such fixedly disposed sub-collectors, which each are operative for a limited number of hours only, that is to say for a given sub-period of the solar day—reckoned from sunrise to sunset—but for that sub-period are operative in such a manner as to be productive of optimally high liquid heating temperatures, in particular temperatures as much as possible in excess of 100° C., whereby the collecting device becomes extremely suitable especially for industrial use.

To achieve the above and other objects, there is provided according to the present invention a solar heat collection device of the kind defined above, and in which the collectors are arranged to be fixedly disposed as sub-collectors each of a set of at least two of such collectors, which are to be arranged with one longitudinal edge of their screen adjoining one another, which are of identical construction and each designed to collect solar heat during an associated sub-period of at least two consecutive sub-periods of the solar day, each sub-collector containing a primary liquid heating tube and a separate, secondary liquid heating tube parallel to said primary liquid heating tube and connected in series with said primary liquid heating tube in the bottom part of the collector, said two tubes, in cross-section, adjoining one another in the direction of depth of the trough formed by said screen and extending, in that direction, from the deepest part of said trough for a joint height which is no greater than approximately one-fourth of the aperture width measured between the longitudinal edges of the screen, the reflection screen of each sub-collector having, in cross-section, such a curved form that said screen, disposed in a position in which its longitudinal median plane is directed to the sun halfway the sub-period concerned, during a central period falling within said sub-period and corresponding with an angular range of the position of the sun from $-X°$ to $+X°$ relative to said longitudinal median plane, reflects the sun rays incident upon said screen substantially on to said primary tube, and during shorter time intervals, relative to said central period, each immediately before and immmediately after said central period, reflects the sun rays incident upon the screen mainly to the anterior secondary tube, the longitudinal median planes of the two sub-collectors forming the set being angularly offset relatively to each other through an angle of at least approximately $2X°$.

According to a first favourable embodiment according to the invention, as shown in the accompanying drawing, the central period of each sub-collector coincides with practically the entire associated sub-period of such sub-collector, with the two adjoining short time intervals, which accordingly fall outside said sub-period, and overlap the sub-periods of adjoining sub-collectors, having a relatively short duration.

According to a different, equally favourable embodiment according to the invention, however, the sub-period may correspond with the associated central period referred to increased by said two associated shorter time intervals immediately before and after said central period.

As a result of the special construction and arrangement as described above, in the collection device according to the present invention, the greatest possible concentration of collected solar heat is achieved in the sub-collectors, and the liquid is accordingly heated to relatively very high temperatures.

Furthermore, in the apparatus according to the invention, preferably at least one of the two liquid heating tubes, and in particular the primary liquid heating tube located posterior to the secondary liquid heating tube, has an elongated cross-sectional shape in the direction of depth of the trough. In the further embodiment first mentioned hereinbefore, the secondary liquid heating tube is perferably of substantially round cross-sectional configuration. In the other embodiment mentioned above, the two liquid heating tubes may be of elongated cross-sectional configuration, and be approximately of equal size.

According to the invention, in which, as stated above, the two liquid heating tubes used in each sub-collector extend with their axis parallel to the plane of the collector aperture, the highest possible liquid temperature is in principle reached in the posterior, primary liquid heating tube, which is located in the deeper part of the trough. The secondary liquid heating tube extending anterior to it is series-connected to the primary liquid heating tube at the lowest point of the two heating tubes, that is to say, in the lower end of the sub-collector. The secundary tube functions in particular also as a heating tube for the liquid contained in it, which liquid subsequently passes from the secondary tube through the primary tube, owing to which such liquid can be heated to considerably higher maximum temperature in the primary liquid heating tube during the sub-period concerned, in particular during the central period. Such heating begins during the time interval immediately preceding said central period. During the time interval following the central period concerned in the sub-period for which the sub-collector is destined, the drop in temperature between the temperature maximums successively reached in the successive sub-collectors is equalized in the liquid circulation system to which the liquid heating tubes of the sub-collectors of the set are connected, through heating in the secondary tube.

The secondary liquid heating tube extending anteriorly along the primary liquid heating tube also prevents unduly rapid cooling of the primary liquid heating tube, which has been heated to a higher temperature level.

One possible embodiment, in which at least two of such sub-collectors are arranged for successive sub-periods, is characterized according to the present invention in that the curved shape of the reflection screen is designed for a sub-period of the solar day corresponding to an angular range of solar position in the order of 45°. This, accordingly, corresponds to sub-periods in the order of 3 hours. It has been found that with sub-collectors thus designed, during the sub-periods referred to, relatively very high liquid temperatures can be reached in an extremely beneficial manner, even at places of considerable degree of latitude, and during the cold season. In that arrangement, therefore, it is the intention that the sub-collectors destined for two consecutive sub-periods are so arranged and disposed that the shorter time interval following the central period of the first-operative sub-collector always overlaps the beginning of the sub-period of the second sub-collector. If the "shorter time interval" referred to, as in one of the embodiments referred to hereinbefore, falls within the sub-period, then the sub-periods overlap.

According to the invention, a particularly practical and advantageous arrangement with a high solar energy efficiency is obtained if, in accordance with a further elaboration of the invention, a plurality of sets of sub-collectors are used, each arranged pair-wise in the manner described with longitudinal edges adjoining one another, which sets are grouped in a plurality of successive units, each unit comprising at least one set consisting of one pair of sub-collectors designed and arranged in accordance with the foregoing, and in which, if there are more than one set of two sub-collectors in each unit, the adjoining outer longitudinal edges of the screens of adjoining pairs of sub-collectors of said unit are practically directly adjacent to each other, and are arranged with the longitudinal axes of all sub-collectors per unit in one common plane, which planes of successive, adjacent units enclose an angle of approximately 180°−2X° with each other, all the liquid heating tubes of the sub-collectors of corresponding orientation in each unit and in the immediately adjacent units being connected to a header of their own, said header forming part of the liquid circulation system.

The invention will now be described in more detail with reference to the accompanying drawings, showing exclusively by way of example a diagrammatic, cross-sectional view of an embodiment of the kind first mentioned hereinbefore of a sub-collector according to the invention, and of an arrangement of a plurality of units, each having a plurality of double collectors formed by pairs of such sub-collectors. In said drawings, FIG. 1 is a cross-sectional view of the sub-collector;

FIG. 2 is a cross-sectional view on a considerably smaller scale, showing a plurality of sub-collectors as shown in FIG. 1, connected to a common liquid circulation system.

In FIG. 1, generally designated by reference numeral 1 is a sub-collector comprising a reflection screen 2 or curved cross-sectional form and extending between parallel longitudinal edges 3 and 4.

Reference numeral 5 designates a flat sheet permeable to sun rays, and covering the sub-collector aperture defined between the longitudinal edges 3 and 4.

In the embodiment shown, dimensions contemplated are an aperture width, measured between the longitudinal edges 3 and 4, of approximately 300 mm, a greatest depth of the "trough" formed by the curved reflection screen 2 of approximately 180 mm, and a length of the sub-collector—measured between the transverse end walls, not shown in the drawings—of approximately 2000 mm. These mearsurements, however, are mentioned solely by way of example, that is to say, the invention is by no means intended to be limited to such dimensions for the sub-collector.

By M-M is designated the longitudinal median plane of the sub-collector. This plane passes through the lowermost, deepest point N, in FIG. 1, of the cross-section of screen 2. Reference nunerals 6 and 7 respectively designate a primary liquid heating tube, which is markedly elongated in the direction of depth of the trough, and a round secondary liquid heating tube. These tubes are positioned with their axes in the median plane, spaced a considerable distance behind—in FIG. 1 beneath—and extending parallel to cover plate 5 in the trough. The leaders of reference numerals 6 and 7 extend to the axes of the liquid heating tubes concerned. These tubes are designed to cause liquid of a liquid circulation system to be heated therein by means of sun rays shining through the sub-collector aperture and, after passing sheet 5, falling on tubes 6 and/or 7 either direct or through reflection by reflection screen 2.

For a number of parallel sun rays f-l, which enclose an angle of 22° 30′ with the median plane M-M, the places where they fall on to the right-hand half of screen 2, as viewed in FIG. 1, are designated by F-L. The associated rays reflected by the screen are respectively designated by $f_1$-$l_1$.

Now, the curved shape of screen 2 and the arrangement and dimensioning of tube 6 is such that these reflected rays $f_1$-$l_1$ fall onto tube 6, and this in the upper cross-sectional portion of tube 6, as viewed in FIG. 1, at which reference letter A has been placed.

It will be clear that the sunrays enclosing a smaller angle than 22° 30′ with the median plane M-M—with an assumed movement of the sun in the clock-wise direction in FIG. 1, therefore, rays shining into the trough later than rays f-l—will be reflected by the reflection screen on to cross-sectional portions of tube 6 located lower, as viewed in FIG. 1, than the above portion A.

As the cross-sectional profile of tube 6 extends practically up to N, that is to say, the deepest portion of screen 2, the above means that the rays reflected later continue to fall on to tube 6.

Substantially the same applies to incident rays making the same angle with the median plane as rays f-l and reflected by the left-hand half of screen 2, as viewed in FIG. 1, two of which are designated by t and s, and the associated rays respectively reflected in T and S by reference numerals $t_1$ and $s_1$, with the understanding that the reflected rays fall on the lower part B of tube 6, as viewed in FIG. 1. Rays reflected by the left-hand half of the screen in later periods will be reflected to the higher zones of tube 6.

On account of the symmetry, the opposite applies of course to the rays which, in FIG. 1, instead of, like rays f-l, shining into the trough from top left to bottom right, shine from top right to bottom left at an angle of 22° 30' and are reflected by screen 2, and to the rays enclosing a smaller angle with said median plane, i.e.—with the sun moving as stated above—those previously reflected by said screen.

It follows from the above that the liquid heating tube 6 is intensely heated during the sub-period of the solar day—from sunrise to sunset—in which the sun moves through an angle of $-22°30'$ to $+22°30'$ relative to the median plane with the collector being fixedly disposed with the axes of tubes 6 and 7 extending in mutually parallel, vertical planes extending in the North-South direction.

Naturally it is recommendable for the angle of inclination of the plane of the aperture covered by sheet 5 relative to the horizontal plane to be adapted to the degree of latitude of the site of the sub-collector. Preferably the arrangement is such that the sun rays shine into the trough in directions deviating as little as possible from the perpendicular direction to the plane of aperture.

FIG. 1 further shows a sun ray $f_2$, which encloses an angle of $22°30'+5°$ to the median plane M-M. This ray $f_2$ is reflected by screen 2 in point F as a reflected ray $f_3$ which falls on to the round tube 7. This applies equally to practically all sun rays shining through sheet 5 onto the right-hand half of screen 2, as viewed in FIG. 1, during the period when the sun moves from direction $f_2$ to direction f. During this interval, which precedes the above sub-period—and the duration of which will be approximately equal to one-ninth of the sub-period—the liquid heating tube 7 is still rather intensely heated, owing to its considerably smaller cross-sectional area relative to tube 6.

Tubes 6 and 7 are series-connected at their lower ends in a manner not shown in the drawings. The set of tubes 6 and 7 thus interconnected is further connected to the liquid circulation system, only partly shown in FIG. 2, in which the heat collected in the liquid is discharged through heat exchange for utilization thereof, the arrangement being such that the liquid successively flows first through the secondary tube 7, in which it is preheated, and next through the primary tube 6. It is thus achieved that the temperature of the liquid in tube 6 may run up to extra high temperatures already after a short time, reckoned from the beginning of the sub-period.

In a corresponding manner, the liquid in the secondary liquid heating tube 7 is after-heated in the interval corresponding with an angular displacement of the sun of 5° following the sub-period referred to, mainly by the sun rays reflected by the left-hand half of the reflection screen 2, as viewed in FIG. 1.

The above will be clear from the foregoing, since this situation is symmetrical relatively to the median plane M-M.

The after-heating in the secondary tube 7 has the advantage that it lengthens the period of cooling for the posterior primary tube 6. Furthermore, the liquid after-heated in the secondary tube 7 contributes in the liquid circulation system towards reducing the temperature drop following the maximum reached in the sub-period concerned in the primary tube 6, and towards reaching the maximum in the sub-collector arranged for optimum operation in the next sub-period of the solar day.

FIG. 2 shows an extremely advantageous arrangement of a plurality of sets, each consisting of pairs of the sub-collectors described hereinbefore. For the sake of convenience we shall, hereinafter, consider the case in which all sub-collectors are so disposed that the perpendicular planes or their longitudinal axes are parallel to the plane containing the path of the —apparent—movement of the sun, which for example may be realized for two data—in the Northern hemisphere—which are an equal number of days before and after June 21, for example in May and August. Furthermore—naturally—the sun is assumed to move in the clockwise direction.

Designated by I-III, in FIG. 2, are three units each consisting of a pair of double collectors, which in turn are each constituted by two sub-collectors as described hereinbefore. The respective sub-collectors in these units are respectively designated by reference numerals 11-14; 21-24 and 31-34. They are accommodated, per unit, with the axes of their respective fluid heating tubes in co-planar relationship per kind of tube—6 or 7—in a box, shown diagrammatically at I-III. Per unit - I,II and III - the two double collectors have an identical orientation, that is to say, the two double collectors are arranged to receive solar heat through the same angular range of solar position of 90°.

In unit I, sub-collectors 12 and 14 have the same orientation, namely, with their median plane directed to the sun in the position it has approximately 4.5 hours before reaching zenith.

Sub-collectors 11 and 13 of unit I, and also sub-collectors 22 and 24 of unit II are oriented so that the sun passes their median plane approximately 1.5 hours before reaching zenith.

Similarly, the position of sub-collectors 21 and 23 of unit II and of sub-collectors 32 and 34 of unit III is such that the sun passes the respective median planes approximately 1.5 hours after reaching zenith, while—finally—sub-collectors 31 and 33 in unit III have their median planes disposed so that the sun passes these median planes 4.5 hours after reaching zenith.

The planes containing the axes of the four sub-collectors belonging to one unit are parallel to the bottom of the box of the unit concerned. As shown in FIG. 2, the planes in question, and hence also the bottoms of the boxes of adjacent units enclose angles of 135° with each other.

It is clear that, owing to the above arrangement, units I, II and III successively partially overlap each other as regards the angle in which the sun shines into their respective sub-collectors, and they jointly cover an angular range of collecting sun rays of 180°. Each collector unit I, II and III collets itself solar heat through an angle of 90°. In the arrangement shown, the order of collecting solar heat is first by sub-collectors 12 and 14 (I) next by 11 and 13 (I) and by 22 and 24 (II), subsequently by 21 and 23 (II) and 32 and 34 (III), and finally by 31 and 33 (III).

Owing to their arrangement in unit I, sub-collectors 11-24 are destined to collect solar heat during two successive sub-periods each corresponding with an angular range of solar position of 45°, that is to say, sub-collectors 12 and 14 for the first sub-period and sub-collectors 11 and 13 for the next sub-period, which ends when the sun reaches zenith. Similarly, the sub-collectors of unit II are destined to collect solar heat during two successive sub-periods, i.e., sub-collectors 22 and 24 for the sub-period corresponding with the angular range of solar position of 45° immediately preceding the sun's reaching zenith, and sub-collectors 21 and 23 for the sub-period corresponding to the angular range of solar position of 45° immediately following the sun's reaching zenith.

Finally, the sub-collectors of unit III are destined to collect heat from approximately noon (12 hours) to approximately 18.00 hours in the evening, namely, sub-collectors 32 and 34 for the first half of this second half of the day, and sub-collectors 31 and 33 for the latter half of this second half of the day.

As shown, the arrangemment of 12 collectors, subdivided into three units I-III, is accordingly operative through a total angular range of solar position of 180°. Each unit I-III is arranged to have an optimum operative period corresponding to an angular range of solar position of 90°, with the arrangement as a whole, naturally, collecting the most intensive heat during the sub-period corresponding with the ranges of solar position immediately preceding and following the sun's passage through zenith, there being, in that period, four respective collectors in optimally operative condition, namely, first collectors 11, 13, 22 and 24 and next collectors 21, 23, 32 and 34.

It is further shown diagramatically in FIG. 2 how the series-connected fluid tubes 6 and 7 of the various sub-collectors are connected to a common header with regard to the sub-collectors having their median planes orientated in the same position.

The headers referred to and the connections are shown by different dash-dot-lines, respectively for the fluid heating tubes in sub-collectors 12 and 14 at a, for sub-collectors 11, 13, 22 and 24 at b, for sub-collectors 21, 23, 32 and 34 at c and for collectors 31 and 33 at d.

Finally, for the sake of clarity, an arc of 180° is shown for the overall arrangement to show the total range of solar heat collection, while for the central unit II with two sub-periods, the overall arrangement of collection is shown by means of an arc of 90°, and for the preceding and subsequent sub-periods for unit I and unit III arcs of 45°.

It will be clear that the arrangement shown is intended by way of example only, and that it is also possible to have arrangements of sub-collectors with modified sub-periods. It is also possible to have an arrangement in which the sub-periods slightly overlap, while—naturally, the pre-heating and after-heating intervals, too may be realized for modified ranges of angular position.

Furthermore, it may be desireable, in an arrangement as shown in FIG. 2, to give the boxes with the respective units different slopes, that is to say, so that the box containing unit II is least steep in order to approach as much as possible the ideal situation that the sun rays shine into the respective sub-collectors at right angles to their aperture plane.

The important point according to the present invention is that relatively high temperatures can be reached while having the sub-collectors disposed in a fixed position with the special arrangement in which, relative to the total solar day, a sub-collector of a set of at least two of such sub-collectors receives solar heat during a relatively short preferred period. In addition, as appears from the foregoing, the design and proposed arrangement makes for a relatively high spatial efficiency, that is to say, the space needed for the arrangement is relatively modest.

What I claim is:

1. A solar heat collecting device comprising
   a plurality of collectors, each having a reflection screen with a pair of spaced parallel longitudinal edges and with an elongated trough of curved cross-sectional configuration extending between said edges,
   said parallel longitudinal edges defining a collector aperture therebetween,
   a longitudinal median plane of said reflection screen being located centrally between said parallel longitudinal edges,
   at least one liquid-heating tube adapted to be connected to a liquid circulation system and having a tube axis disposed in the longitudinal plane,
   said tube being located behind and parallel to said aperture,
   said collectors adapted to be arranged with the tube axis located in vertical planes extending in the North-South direction,
   characterized in that the collectors are fixedly disposed as sub-collectors composed of a set of at least two collectors,
   said collectors each having one longitudinal edge of their screen adjoining the longitudinal edge of the other screen,
   said collectors being of identical construction and arranged to collect solar heat during an associated sub-period of at least two consecutive sub-periods of the solar day,
   each sub-collector containing a primary liquid heating tube and a separate, secondary liquid heating tube parallel to said primary liquid heating tube and connected in series with said primary liquid heating tube in a bottom part of the collector,
   said two tubes, in cross-section, adjoining one another in the direction of depth of the trough formed by said screen and extending, in that direction, from the deepest part of said trough for a joint height which is no greater than approximately one-fourth of the aperture width measured between the longitudinal edges of the screen,
   the reflection screen of each sub-collector having, in cross-section, a curved form such that said screen, disposed in a position in which its longitudinal median plane is directed to the sun halfway the sub-period concerned, during a central period falling within said sub-period and corresponding with an angular range of the position of the sun from $-X°$ to $+X°$ relative to said longitudinal median plane, reflects the sun rays incident upon said screen substantially on to said primary tube, and during shorter time intervals, relative to said central period, each immediately before and immediately after said central period, reflects the sun rays incident upon the screen mainly to the anterior secondary tube, and
   the longitudinal median planes of the two sub-collectors forming the set being angularly off-set relatively to each other through an angle of at least approximately $2X°$.

2. A solar heat collecting device as claimed in claim 1, wherein the central period of each sub-collector coincides with practically the entire associated sub-period of such sub-collector, with the two adjoining short time intervals, which accordingly fall outside said sub-period, having a relatively short duration.

3. A solar heat collecting device as claimed in claim 1, wherein the sub-period corresponds with the associated central period increased by said two shorter time intervals immediately before and after said central period.

4. A solar heat collecting device as claimed in claim 1, wherein at least one of the two liquid heating tubes has an elongated cross-sectional shape in the direction of depth of the trough.

5. A solar heating device as claimed in claim 1, characterized in that the curved shape of the reflection screen is designed for a sub-period corresponding to an angular range of solar position in the order of 45°.

6. An arrangement of a plurality of sets of solar heat collectors as claimed in claim 1, characterized in that said sets are grouped in a plurality of successive units, each unit comprising at least one set consisting of one pair of sub-collectors and in which, if there are more than one set of two sub-collectors in each unit, the adjoining outer longitudinal edges of the screens of adjoining pairs of sub-collectors of said unit are practically directly adjacent to each other, and are arranged with the longitudinal axes of all sub-collectors per unit in one common plane, the planes of successive units enclosing an angle of approximately 180°- 2X° with each other, all the liquid heating tubes of the sub-collectors of corresponding orientation in each unit and in the immediately adjacent units being connected to a header of their own, said header forming part of a liquid circulation system.

* * * * *